United States Patent [19]

Noakes et al.

[11] 4,044,110

[45] Aug. 23, 1977

[54] METHOD OF FORMING A SILICON CARBIDE ARTICLE - III

[75] Inventors: Jack E. Noakes, Plymouth Township, Wayne County, Mich.; Hiroshi Sato, West Lafayette, Ind.; Leslie L. Terner, West Bloomfield Township, Oakland County, Mich.

[73] Assignee: Ford Motor Company, Dearborn, Mich.

[21] Appl. No.: 619,427

[22] Filed: Oct. 3, 1975

[51] Int. Cl.$^2$ .................................... C01B 31/36
[52] U.S. Cl. ........................ 423/346; 423/345; 264/29.1; 264/328
[58] Field of Search .............. 423/345, 346; 264/29, 264/63, 65, 66, 328

[56] References Cited

U.S. PATENT DOCUMENTS

| | | | |
|---|---|---|---|
| 2,691,605 | 10/1954 | Hediger | 423/346 |
| 2,938,807 | 5/1960 | Andersen | 264/63 |
| 3,175,918 | 3/1965 | McGaaan et al. | 423/345 |
| 3,459,566 | 8/1969 | Wilson, Jr. et al. | 264/29 |
| 3,495,939 | 2/1970 | Forrest | 423/346 |
| 3,718,441 | 2/1973 | Landingham | 264/65 |
| 3,882,210 | 5/1975 | Crossley et al. | 264/328 |
| 3,887,411 | 6/1975 | Goodyear et al. | 264/66 |

FOREIGN PATENT DOCUMENTS

| | | | |
|---|---|---|---|
| 811,647 | 4/1969 | Canada | 423/345 |
| 2,439,930 | 1/1975 | Germany | |
| 892,340 | 3/1962 | United Kingdom | 423/345 |

OTHER PUBLICATIONS

Special Ceramics, 1973, pp. 99–123, Forrest et al.

*Primary Examiner*—O. R. Vertiz
*Assistant Examiner*—Eugene T. Wheelock
*Attorney, Agent, or Firm*—William C. Johnson; Keith L. Zerschling.

[57] ABSTRACT

A method of forming a silicon carbide article is disclosed. Selected weight percentages of silicon carbide particles, graphite particles, if desired, and a thermosetting binder are mixed together and molded into an article by molding techniques which operates on the basis that the thermosetting binder forms a continuous medium about all the particles supported therein. The molded article is heated in the absence of oxygen and the thermosetting binder breaks down to form a low density, vitreous carbon phase. The article is heated in an oxygen containing environment to remove excess surface carbon. The article is silicided at an elevated temperature by penetration of the article through its pore structure with a reactable form of silicon.

2 Claims, No Drawings

METHOD OF FORMING A SILICON CARBIDE ARTICLE - III

BACKGROUND OF THE INVENTION

In recent years there has been much interest in fabrication of articles of complex shape from silicon carbide. One particular area of interest has been the forming of complex shaped articles for gas turbine engine applications from silicon carbide as this material is capable of withstanding temperatures substantially higher than the temperatures which can be withstood by present day super alloys used in gas turbine engines. When such turbine engines are operated at higher temperatures, such as the temperatures which can be used with silicon carbide components in a gas turbine engine, they become much more efficient by giving a greater amount of power for the same fuel consumption.

In attempting to form silicon carbide articles of complex shape, injection molding processes have been developed. In general, these molding processes are carried out by mixing silicon carbide particles, and optionally graphite particles, with a predetermined amount of a thermosetting binder. The article is formed in an injection molding operation, removed from the mold and subjected to heat in the absence of oxygen to reduce the thermosetting binder to carbon. The article is silicided to transform the carbon and any graphite present to silicon carbide thereby to produce a finished article of silicon carbide. A process for producing such an article is disclosed in U.S. Pat. application Ser. No. 389,770 filed Aug. 20, 1973 in the name of Douglas R. Fitchmun and assigned to the assignee of this application, which application is hereby incorporated by reference.

We have found that the prior art processes of siliciding an injection molded article containing silicon carbide and a thermosetting binder had some drawbacks. In particular, the prior art processes were slow, generally did not produce an article which was fully silicided, and were difficulty to perform on a body having any substantial thickness within a reasonable period of time.

One difficulty in the prior art is that the article manufactured in an injection molding process generally will have a slightly higher concentration of thermosetting binder at its surface. When the article is heated to pyrolize the binder, a slightly greater carbon concentration therefore develops at its surface. This extra amount of carbon can cause a closing off of the article's pore structure during a siliciding operation.

SUMMARY OF THE INVENTION

This invention is directed to a method of forming a silicon carbide article, and, more particularly, to a method of forming a silicon carbide article in which the article is generally uniformly silicided throughout its entire volume in a relatively rapid manner.

In accordance with the teachings of this invention a silicon carbide article is formed by carrying out the following process. A flow molding mixture is formed by mixing together 60 to 80 percent, prefereably 65 to 75 percent, by weight of silicon particles having an average particle size in a range from about 40 microns to less than about one micron; and 40 to 20 percent, preferably 35 to 25 percent by weight of a thermosetting binder which produces a flowable liquid phase when melted and which produces carbon upon nonoxitive pyrolysis. Up to 7 percent by weight graphite particles having an average particle size in a range from about 10 to 0.1 microns may be substituted for a portion of the silicon carbide particles and theremosetting binder. A mold release agent may also be employed in the mixture.

The molding mixture is heated to a temperature whereat the thermosetting binder is a liquid. The mixture is then molded into an article by an injection molding technique which operates on the basis that the liquified thermosetting binder forms a continuous medium about the silicon carbide particles and graphite particles, if present, so that the mixture is moldable as if it were a liquid. Once the article has been formed in the molding operation and the thermosetting material is stiffened, the article is removed from the mold and pyrolyzed in the absence of oxygen. In this heating process, the thermosetting binder undergoes a volumetric reduction in breaking down to form a low density vitreous carbon phase. Such action develops a generally interconnected pore structure throughout the article.

The surface of the article is treated to remove any excess carbon thereon. This action assures that the pore structure of the article is open to the surface of the article.

The porous article is heated in the absence of oxygen to a siliciding temperature above the melting temperature of silicon. The article is silicided at an elevated temperature by permitting penetration of the article through its pore structure with a reactable form of silicon. This silicon reacts with the available carbon to form silicon carbide.

The siliciding of the article can be carried out by introducing silicon metal into the chamber containing the article when a nitrogen containing environment surrounds the article. The article is brought in the presence of the nitrogen containing environment to its siliciding temperature in a range from the melting temperature of silicon to 3300° F. The nitrogen containing environment is withdrawn when the siliciding temperature is reached thereby leaving behind silicon metal in a form which penetrates the pore structure of the article and rapidly reacts with the available carbon and graphite, if present, of the article. While the nitrogen environment is present in the chamber holding the article, the nitrogen reacts with the liquid silicon metal to form a silicon nitride skin thereon which stops any penetration of the porous body by the silicon in any form.

As stated above, graphite particles may be mixed with the molding mixture in order to provide another source of reactable carbon in the molded article. If graphite is present in the article, some of the thermosetting binder during the nonoxitive pyrolysis operation will shrink about individual particles of graphite.

DESCRIPTION OF PREFERRED EMBODIMENTS

The method of this invention will be covered in the discussions set forth below. The particular materials set forth in the discussions are not intended to limit the scope of this invention. Any thermosetting polymeric material which originally contains aromatic components or produces such aromatic components upon pyrolysis and is in a flowable liquid phase at temperatures of a plastic molding operation is suitable for use in this method of forming silicon carbide articles by injection molding.

The method of the invention is initiated by mixing together 60 to 80 percent, preferably 65–65 percent, by weight of silicon carbide particles. These silicon carbide particles should have an average particle size in a range from about 40 microns down to less than about 1 micron. Such silicon carbide material is commercially available and is generally alpha silicon carbide. The higher amounts of silicon carbide particles in a mixture can be obtained when the larger particle sizes are used. As the average particle size is reduced towards the lower particle size limit, the amount of silicon carbide which can be loaded into a mix and still be totally surrounded by a liquified thermosetting material with the particles not contacting one another is reduced. This comes about, of course, because for the same given weight of material the smaller particles have a larger surface area to be wet than do the larger particles.

The silicon carbide particles are mixed with 40 to 20 percent, preferably 35 to 25 percent, by weight of a thermosetting binder which produces a flowable liquid phase when melted and which produces carbon upon nonoxitive pyrolysis. The carbon is produced when the thermosetting material breaks down upon pyrolysis to form aromatic components. These aromatic components subsequently form a vitreous, low density carbon phase. Some thermosetting materials which are satisfactory for use in the method of this invention are the following: phenol furfural, phenol formaldehyde, polybenzimindazole, phenolic-naphthalenediol terpolymer, polyphenylenes, polyvinyl chloride, polyvinylidiene chloride and polyphenol polymer. At room temperatures these materials are generally in a solid state, but when they are heated to a temperature of an injection molding operation, they melt and produce a liquid phase.

If desired, graphite particles may be added to the molding mix. If these particles are added, they are added up to 7 percent by weight of the mix. If graphite is used, it mainly displaces the silicon carbide particles but it also displaces a small amount of the thermosetting binder. For molding mix quantities when 0 to 7 percent by weight of graphite is used, the broad limits are 60 to 75 percent by weight of silicon carbide particles and 40 to 23 percent by weight of the thermosetting material. Also the graphite particles should have an average particle size in a range from about 10 to about 0.1 microns. Graphite particles having an average particle size of around 0.5 microns are preferred.

No matter what combination of materials are used in forming the molding mixture, the essential feature is that sufficient thermosetting material is present with the particles that when the thermosetting binder is liquified, it forms a continuous phase about the particles which are suspended therein. This allows the molding mixture to be injection molded by flow molding techniques.

After the molding mixture has been formed, the mixture is heated to a temperature at which the thermosetting binder is in a liquid phase. The liquid phase must completely surround the individual silicon carbide particles and any graphite particles present. The thermosetting material must form a continuous phase about these particles so that the molding mixture is a flowable mass which can be injection molded.

The mixture is injection molded by forcing it under pressure in an injection molding machine into a mold. Such an injection molding technique operates on the basis that the flowable thermosetting binder forms a continuous phase about the particles contained therein. Since the mixture is a flowable mass, the mold into which it is injection molded can be of a complex shape.

For example, the mold may define the shape of a rotor or a stator of a gas turbine engine.

After this molding operation, the thermosetting binder is stiffened by permitting the material sufficient time in the mold that the thermosetting materials crosslinks. This stiffening lends strength to the molding article so that it may be removed from the mold without damage thereto.

The molded article is then subjected to a pyrolyzing operation in the absence of oxygen. Under these conditions, the thermosetting binder in the molded article undergoes a volumetric reduction in breaking down to form a vitreous carbon phase. A portion of the thermosetting material is driven off as volatile matter but a portion of it remains behind by forming aromatic components which subsequently form carbon. The carbon formed is a vitreous carbon phase which serves to bond the silicon carbide particles and any graphite particles present together. With respect to the smaller graphite particles, the vitreous carbon may surround portions thereof.

The pyrolyzing action develops a generally interconnecting pore structurethroughout the article as a result of the volumetric reduction of the thermosetting material. the pyrolyzing operations may be carried out at a final temperature in any manner which accomplishes the intended function. The heating and cooling rates should be such that no substantial stresses are set up in the article which might cause damage thereto. A typical pyrolyzing operation is one which is carried out by heating the article from room temperature to 700° F at a rate of about 50° F per hour, from 700° F to 1200° F at a rate of about 25° F per hour, and from 1200° F to a final temperature in a range of from 1850° to 2500° F at a rate of 50° F per hour. The article may be cooled back to room temperature at a rate of about 150° F per hour.

After the pyrolyzing operation, the article generally has a slightly greater concentration of carbon at its surface than in its central portions. This extra carbon may cause trouble in a siliciding operation by sealing up pores of the article when it reacts with the silicon. This difficulty is avoided by a cleaning operation which eliminates some of the excess surface carbon. For example, the article is heated in nitrogen to a treatment temperature in the range of 700° F to 850° F. When the treatment temperature is reached, oxygen is introduced into the treatment chamber and the article is exposed to the oxygen for a period of time sufficient to remove excess surface carbon and insure that the pore structure of the article is open to the article's surface. For example, oxygen in a concentration of 10 to 30 percent by volume may be used for treating the article up to five minutes.

After the surface treatment operation, the article may be cooled to room temperature, if desired, and then subsequently reheated so that it may be silicided in a separate operation. On the other hand, the article may be brought from the surface treatment operation directly to a temperature for the siliciding operation. Generally, the article is cooled to room temperature and reheated as it is silicided in a different furnace than that in which it is pyrolyzed.

After surface treatment, the article is heated in the absence of oxygen, for example in a nitrogen atmosphere, to a siliciding temperature which is generally a temperature above the melting point of silicon but less than 3300° F. The article may be heated at any heating rate which does not cause substantial thermal stresses to be set up therein thus possibly leading to damage to the article. For example, a heating rate of about 200° F per minute is satisfactory. A lower siliciding temperature, for example just above the melting point of silicon, is used for small articles. A higher siliciding temperature is used for articles of larger cross section. In either case, a siliciding of the article is obtained in a relatively short period of time.

In order to carry out the siliciding operation, it is necessary to make available in the vicinity of the article pure silicon metal. This metal may be introduced into the chamber through appropriate apparatus already known in the art at a time when a nitrogen containing environment is present and the article is being brought to its siliciding temperature. On the other hand, if desired, the silicon may be made available to the article after the article has achieved its siliciding temperature. It is preferred, however, to introduce the silicon adjacent to the article at the time that the article is being heated in a nitrogen containing environment to its siliciding temperature.

The temperature of the chamber in which the article is resting is above the melting point of the silicon metal which is introduced into the chamber as a solid metal. If a nitrogen atmosphere is present, the silicon will first melt and as it does so, a thin skin of silicon nitride will form thereover by the action of the nitrogen on the silicon. The silicon is disabled in this manner from the reacting with the carbon and graphite in the article because of the formation of this skin. We have found that it is important to keep the silicon from reacting with the article until the article is at its siliciding temperature.

Once the article has been brought to its siliciding temperature, the nitrogen containing environment surrounding the same is replaced with a vacuum lower than the vapor pressure of the liquid silicon at the siliciding temperature. By drawing a lower vacuum some of the silicon volatilizes into the atmosphere surrounding the article and thereby enters the pore structure of the article. It is apparent that the higher the temperature, the higher the vapor pressure of the silicon metal and the less vacuum needed on the system. For example, higher vacuums are needed to accomplish the volatilization of the silicon metal at temperatures closer to the melting point of the silicon. The drawing of the vacuum initially operates on the unstable silicon nitride skin to break it down and leave pure silicon behind.

When the skin of silicon nitride has been removed from the molten silicon metal, the silicon in a reactable state penetrates the article through its pore structure. This silicon reacts with the carbon developed as a result of decomposition of the thermosetting material and it also reacts with any graphite that is present in the article to transform the same into silicon carbide. The silicon treatment may remain in effect for a period of time up to 30 minutes or more to insure that all carbon in the article is converted to silicon carbide.

The finished article is recovered by cooling the article to room temperature at a rate which does not cause any thermal fracturing of the material. For example the furnace may be turned off and allowed to cool back to room temperature with the article therein.

What we claim is:

1. In a method of forming a silicon carbide article: (a) wherein 60–80% by weight of silicon carbide particles having an average particle size in the range from about 40 microns to less than 1 micron are mixed together with 40–20% by weight of a thermosetting binder which produces a flowable liquid phase when melted and which produces carbon upon nonoxidative pyrolysis; (b) wherein the mixture is heated to a temperature whereat the thermosetting binder is in a liquid phase; (c) wherein the mixture is injected molded by an injection molding technique to form an article, the injection molding technique operating on the basis that the flowable thermosetting binder forms a continuous phase about the silicon carbide particles supported therein; (d) wherein the thermosetting binder is stiffened to lend sufficient strength to the molded article so that it may be removed from its mold; (e) wherein the molded article is pyrolized in the absence of oxygen so that the thermosetting binder undergoes a volumetric reduction in breaking down to form a vitreous carbon phase which serves to bond silicon carbon particles together, this action also developing a pore structure throughout the article and producing excess carbon at the surface; and (f) wherein the article is silicided at an elevated temperature by permitting the penetration of the article through its pore structure with silicon whereby the silicon reacts with the available carbon to form silicon carbide; the improvement which comprises:

treating the surface of the article after it has been pyrolized and prior to the siliciding thereof to remove said excess carbon on the surface thereof by heating the article to a treatment temperature in the range from 700° F to 850° F and thereafter exposing the article to an oxygen containing atmosphere for a period of time up to 5 minutes.

2. In a method of forming a silicon carbide article: (a) wherein 60–75% by weight of silicon carbide particles having an average particle size in the range from about 40 microns to less than 1 micron and 0 to 7% by weight of graphite having an average particle size in the range from about 10 to 0.1 microns are mixed together with 40–23% by weight of a thermosetting binder which produces a flowable liquid phase when melted and which produces carbon upon nonoxidative pyrolysis; (b) wherein the mixture is heated to a temperature whereat the thermosetting binder is in a liquid phase; (c) wherein the mixture is injection molded by an injection molding technique to form an article, the injection molding technique operating on the basis that the flowable thermosetting binder forms a continuous phase about the silicon carbide particles supported therein; (d) wherein the thermosetting binder is stiffened to lend sufficient strength to the molded article so that it may be removed from its mold; (e) wherein the molded article is pyrolized in the absence of oxygen so that the thermosetting binder undergoes a volumetric reduction in breaking down to form a vitreous carbon phase which serves to bond the silicon carbide particles together, this action also developing a pore structure throughout the article and producing excess carbon at the surface; and (f) wherein the article is silicided at an elevated temperature by permitting the penetration of the article through its pore structure with silicon whereby the silicon reacts with the available carbon to form silicon carbide; the improvement which comprises:

treating the surface of the article after it has been pyrolized and prior to the siliciding thereof to remove said excess carbon on the surface thereof by treating the article to a treatment temperature in the range from 700° F to 850° F and thereafter exposing the article to an oxygen containing atmosphere for a period of time up to 5 minutes.

* * * * *